United States Patent
Chen et al.

(10) Patent No.: US 10,944,317 B2
(45) Date of Patent: Mar. 9, 2021

(54) 120-HZ RIPPLE REDUCTION WITH PIR CONTROLLER FOR LLC CONVERTER

(71) Applicant: Murata Manufacturing Co., Ltd., Nagaokakyo (JP)

(72) Inventors: Yang Chen, Markham (CA); Hongliang Wang, Markham (CA); Yan-Fei Liu, Markham (CA); Jahangir Afsharian, Markham (CA); Bing Gong, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/470,388

(22) PCT Filed: Jan. 26, 2018

(86) PCT No.: PCT/US2018/015598
§ 371 (c)(1),
(2) Date: Jun. 17, 2019

(87) PCT Pub. No.: WO2018/140824
PCT Pub. Date: Aug. 2, 2018

(65) Prior Publication Data
US 2020/0112244 A1      Apr. 9, 2020

Related U.S. Application Data

(60) Provisional application No. 62/451,129, filed on Jan. 27, 2017.

(51) Int. Cl.
*H02M 3/335* (2006.01)
*H02M 1/14* (2006.01)
*H02M 1/088* (2006.01)

(52) U.S. Cl.
CPC ........... *H02M 1/143* (2013.01); *H02M 1/088* (2013.01); *H02M 3/33576* (2013.01); *H02M 3/33507* (2013.01)

(58) Field of Classification Search
CPC ........... Y02B 70/1425; Y02B 70/1491; H02M 2007/4818; H02M 2007/4815;
(Continued)

(56) References Cited

U.S. PATENT DOCUMENTS 8,824,174 B2    9/2014  Lai et al.
2009/0290385 A1  11/2009  Jungreis et al.
(Continued)

FOREIGN PATENT DOCUMENTS

| CN | 202617007 U | 12/2012 |
| CN | 103532128 A | 1/2014 |
| CN | 104269869 B | 6/2016 |

OTHER PUBLICATIONS

Official Communication issued in International Patent Application No. PCT/US2018/015598, dated Jun. 22, 2018.
(Continued)

*Primary Examiner* — Bryan R Perez
(74) *Attorney, Agent, or Firm* — Keating & Bennett, LLP

(57) ABSTRACT

An LLC converter includes a transformer that includes a primary winding and a secondary winding, a resonant stage that includes the primary winding, a switching stage that includes switches and that is connected to an input voltage and the resonant stage, a rectifying stage that is connected to the secondary winding and that provides an output voltage, and a controller that senses the output voltage and that controls switching of the switches based on proportional-integral control of the output voltage to reduce errors in the output voltage with respect to a DC voltage and based on quasi-resonant control of the output voltage to reduce errors
(Continued)

LLC converter with Quasi-PIR control in the output voltage with respect to a range of voltages with a frequency bandwidth.

20 Claims, 16 Drawing Sheets

(58) Field of Classification Search
CPC ....... H02M 2007/4811; H02M 1/4241; H02M 2001/0058; H02M 2001/0009; H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
USPC ................... 363/21.02, 21.03, 15–17, 97–98
See application file for complete search history.

(56) References Cited

U.S. PATENT DOCUMENTS

| | | | |
|---|---|---|---|
| 2012/0320641 A1 | 12/2012 | Chapman | |
| 2013/0003430 A1 | 1/2013 | Reddy | |
| 2013/0250624 A1* | 9/2013 | Fornage | H02M 7/4807 363/17 |
| 2015/0084544 A1 | 3/2015 | Mitterbacher et al. | |
| 2015/0271883 A1* | 9/2015 | Kim | H05B 33/0815 315/291 |

OTHER PUBLICATIONS

Teodorescu et al., "Proportional-Resonant Controllers. A New Breed of Controllers Suitable for Grid-Connected Voltage-Source Converters", Journal of Electrical Engineering, pp. 1-6.

Shen et al., "A New Feedback Method for PR Current Control of LCL-Filter-Based Grid-Connected Inverter", IEEE Transactions on Industrial Electronics, vol. 57, No. 6, Jun. 2010, pp. 2033-2041.

Alemi et al., "Resonance Suppression Based on PR Control for Single-Phase Grid-Connected Inverters With LLCL Filters", IEEE Journal of Emerging and Selected Topics in Power Electronics, vol. 04, No. 2, Jun. 2016, pp. 459-467.

Ketzer et al., "Virtual Flux Sensorless Control for Shunt Active Power Filters With Quasi-Resonant Compensators", IEEE Transactions on Power Electronics, vol. 31, No. 7, Jul. 2016, pp. 4818-4830.

Zammit et al., "Comparison between PI and PR Current Controllers in Grid Connected PV Inverters", World Academy of Science, Engineering and Technology International Journal of Electrical, Computer, Energetic, Electronic and Communication Engineering, vol. 8, No. 2, 2014, pp. 221-226.

Zhang et al., "A Systematic Method for Designing a PR Controller and Active Damping of the LCL Filter for Single-Phase Grid-Connected PV Inverters", Energies 2014, vol. 7, Jun. 24, 2014, pp. 3935-3954.

Kuperman, "Proportional-Resonant Current Controllers Design based on Desired Transient Performance", IEEE Transactions on Power Electronics, vol. 30, No. 10, Oct. 2015, pp. 5341-5345.

Teodorescu et al., "Proportional-resonant controllers and filters for grid-connected voltage-source converters," IEEE Proceedings—Electric Power Applications, vol. 153, No. 5, Sep. 2006, pp. 750-762.

Chen, W. et al.; "One-Dimensional Optimization for Proportional-Resonant Controller Design Against the Change in Source Impedance and Solar Irradiation in PV Systems"; IEEE Transactions on Industrial Electronics, vol. 61, No. 4, Apr. 2014; pp. 1845-1854.

Official Communication issued in corresponding Chinese Patent Application No. 201880005249.8 dated Jul. 21, 2020.

* cited by examiner

LLC converter with Quasi-PIR control operating range of LLC converter control block diagram of a quasi-PIR controller Open-loop control at point A (400 V, 60 W)

Open-loop control at point D (360 V, 300 W)

PI control at point B (360 V, 60 W)

PI control at point D (360 V, 300 W)

Fig. 13 Quasi-PIR control at point B (360 V, 60 W)

Quasi-PIR control at point D (360 V, 300 W)

120-HZ RIPPLE REDUCTION WITH PIR CONTROLLER FOR LLC CONVERTER

BACKGROUND OF THE INVENTION

1. Field of the Invention

The present invention relates to control methods of an LLC converter. More specifically, the present invention relates to control methods of an LLC converter with 120-Hz ripple reduction.

2. Description of the Related Art

Conventional LLC converters can have a 120-Hz ripple in the output voltage and can have a narrow frequency bandwidth in the input voltage.

It is known to use proportional-integral (PI) control to control the output voltage of a converter. But PI control does not adequately address the 120-Hz ripple in the output voltage. In PI control, there is zero steady-state error with the DC reference voltage. But there is a small steady-state error with the 120-Hz AC reference voltage because the PI-control bandwidth is not large enough for the 120-Hz AC reference voltage.

It is also known to use proportional resonant (PR) control to control the output voltage of a converter. The PR control has been used in some inverter applications, such as off-grid inverters and grid-tied inverters. If the converter provides a 60-Hz AC voltage or current, then PR control can achieve zero steady-state error if the PR control uses a 60-Hz AC reference voltage.

SUMMARY OF THE INVENTION

Preferred embodiments of the present invention provide PI and quasi-resonant control methods and converters that use methods in which, in a simple design, a 120-Hz ripple in the output voltage is reduced and in which the frequency bandwidth of the input voltage is increased. The PI and quasi-resonant control methods use two reference voltages. The first reference voltage is a DC voltage, such as, for example, 12 V, and the other reference voltage is 120-HZ AC voltage, for example. The PI control with the first reference voltage provides DC output voltages very well, and the quasi-resonant control addresses twice the grid-frequency, where the grid-frequency has a little fluctuation between 57 HZ and 63 HZ, which is why quasi-resonant control is used. The sampling periods of the PI control and the quasi-resonant control are different. Using different sampling periods achieves good performance and reduces calculation time and digital space.

According to a preferred embodiment of the present invention, an LLC converter includes a transformer that includes a primary winding and a secondary winding, a resonant stage that includes the primary winding, a switching stage that includes switches and that is connected to an input voltage and the resonant stage, a rectifying stage that is connected to the secondary winding and that provides an output voltage, and a controller that senses the output voltage and that controls switching of the switches based on proportional-integral control of the output voltage to reduce errors in the output voltage with respect to a DC voltage and based on quasi-resonant control of the output voltage to reduce errors in the output voltage with respect to a range of voltages with a frequency bandwidth.

Preferably, a first sampling period of the proportional-integral control is longer than a second sampling period of the quasi-resonant control. The controller preferably controls the switching of the switches using pulse-frequency modulation.

The proportional-integral control and the quasi-resonant control are preferably both discrete control. Preferably, a transfer function of the quasi-resonant control is provided by:

$$G_{R2}(z) = \frac{k_r T_R^2}{(1-z^{-1})^2 + 2\omega_c T_R(1-z^{-1}) + (\omega T_R)^2} = \frac{k_R}{(1-z^{-1})^2 + \alpha(1-z^{-1}) + \theta^2}$$

where $\omega$ is a line angular frequency, $\omega_c$ is a bandwidth angular frequency, $k_r$ is resonant gain in continuous quasi-resonant control, $\alpha = 2\omega_c T_R$, $k_R = k_r T_R^2$, $\theta = \omega T_R$, $k_R$ is a discrete resonant gain, and $T_R$ is the second sampling period of the quasi-resonant control.

The range of voltages preferably includes a voltage with a frequency of 120 Hz. The resonant stage preferably further includes a resonant inductor, a resonant capacitor, and a magnetizing inductor. The switching stage preferably includes first and second primary switches that are controlled by the controller. The rectifying stage preferably includes first and second synchronous rectifiers. The controller preferably is a digital signal controller.

According to a preferred embodiment of the present invention, a method of controlling an LLC converter includes sensing an output voltage of the LLC converter and switching switches connected to a primary winding of a transformer included in the LLC converter based on proportional-integral control of the output voltage to reduce errors in the output voltage with respect to a DC voltage and based on quasi-resonant control of the output voltage to reduce errors in the output voltage with respect to a range of voltages with a frequency bandwidth.

The method preferably further includes sampling the output voltage with a first sampling period with respect to the proportional-integral control and sampling the output voltage with a second sampling period with respect to the quasi-resonant control. The second sampling period preferably is longer than the first sampling period. The switching preferably uses pulse-frequency modulation.

The proportional-integral control and the quasi-resonant control preferably are both discrete control. A transfer function of the quasi-resonant control is provided by:

$$G_{R2}(z) = \frac{k_r T_R^2}{(1-z^{-1})^2 + 2\omega_c T_R(1-z^{-1}) + (\omega T_R)^2} = \frac{k_R}{(1-z^{-1})^2 + \alpha(1-z^{-1}) + \theta^2}$$

where $\omega$ is a line angular frequency, $\omega_c$ is a bandwidth angular frequency, $k_r$ is resonant gain in a continuous quasi-resonant controller, $\alpha = 2\omega_c T_R$, $k_R = k_r T_R^2$, $\theta = \omega T_R$, $k_R$ is a discrete resonant gain, and $T_R$ is a sampling period of the quasi-resonant control.

The range of voltages preferably includes a voltage with a frequency of 120 Hz. The switches preferably are connected to a resonant stage that includes a resonant inductor, a resonant capacitor, a magnetizing inductor, and the primary winding. The switching preferably includes switching first and second primary switches connected to the primary winding. The method preferably further includes rectifying a voltage from a secondary winding of the transformer to provide the output voltage. the switching is preferably controlled using a digital signal controller.

The above and other features, elements, characteristics, steps, and advantages of the present invention will become more apparent from the following detailed description of preferred embodiments of the present invention regarding the attached drawings.

DETAILED DESCRIPTION OF PREFERRED EMBODIMENTS

Figure 1:
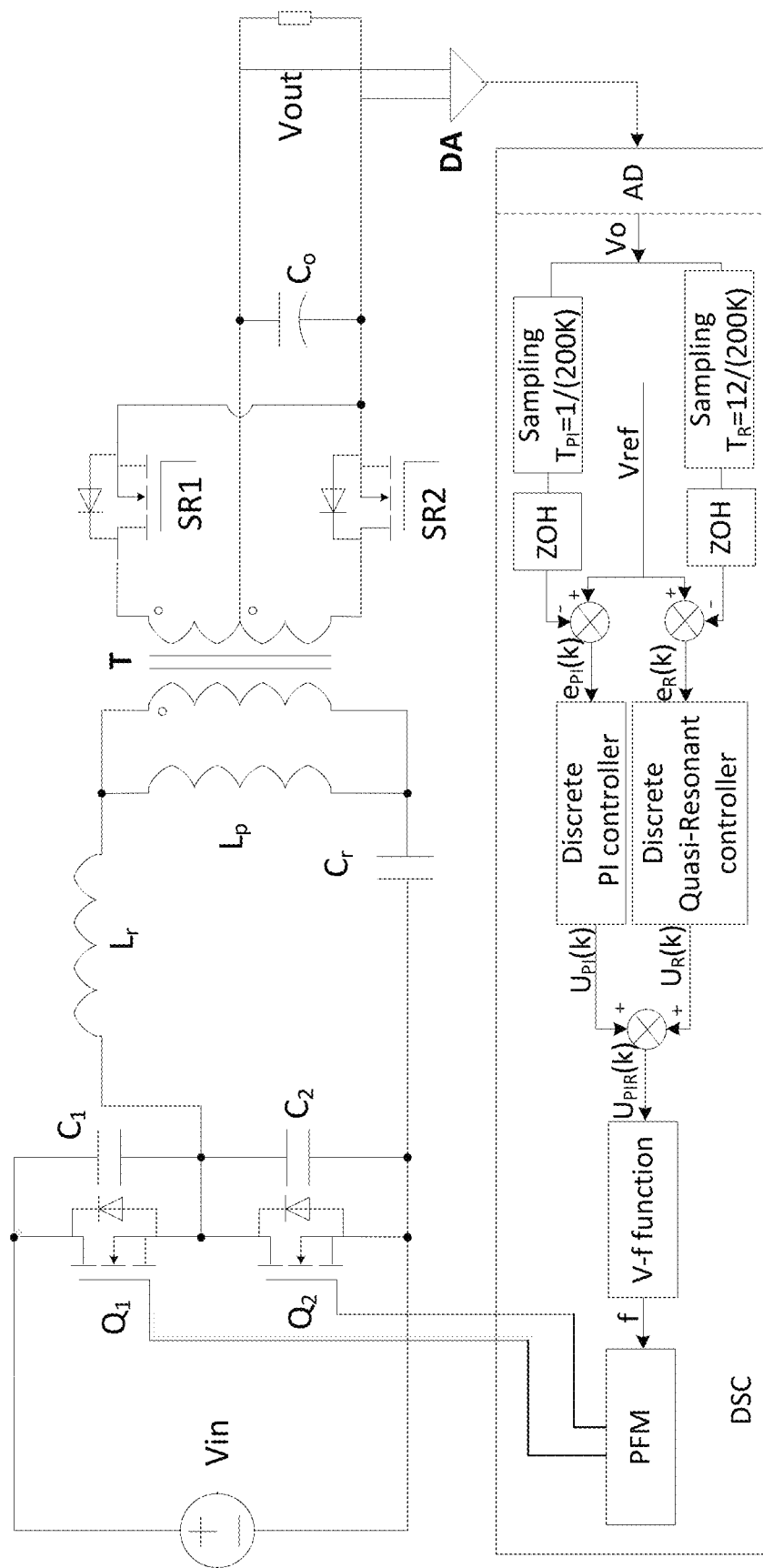
FIG. 1 shows a circuit diagram of an LLC converter with quasi-PIR control.

FIG. 1 shows an LLC converter with quasi-PIR control. The LLC converter includes a primary side and a secondary side. The primary side is the side of the converter located between the DC input Vin and the transformer T. The secondary side is the side of the converter located between the transformer T and the output voltage Vout. The LLC converter includes a switching stage, a resonant stage, and a rectifying stage.

A primary circuit includes primary switches $Q_1$, $Q_2$, resonant inductor $L_r$, resonant capacitor $C_r$, and inductor $L_p$. The switching stage includes the primary switches $Q_1$, $Q_2$, and the resonant stage includes the resonant inductor $L_r$, the resonant capacitor $C_r$, inductor $L_p$, and the primary winding of the transformer T. It is possible to connect capacitors $C_1$, $C_2$ in parallel across the primary switches $Q_1$, $Q_2$. For example, it is possible to use capacitors with a very small capacitance, e.g., 100 pF, to improve the consistency of the primary switches $Q_1$, $Q_2$. The parasitic capacitance of each primary switch Q1, Q2 changes with the voltage and/or the current. The capacitors $C_1$, $C_2$ are not necessary. The primary switches $Q_1$, $Q_2$ are connected to input voltage Vin. The resonant inductor $L_r$, the inductor $L_p$, and the resonant capacitor $C_r$ are connected in series with each other and are connected between the negative terminal of the input voltage Vin and a node between the primary switches $Q_1$, $Q_2$. Inductor $L_p$ is connected in parallel across the primary windings of the transformer T. Resonant inductor $L_r$, resonant capacitor $C_r$, and inductor $L_p$ define an LLC resonant tank. The transformer T turns ratio is N.

A secondary circuit includes synchronous rectifiers $SR_1$, $SR_2$, and capacitor $C_O$. Synchronous rectifiers $SR_1$, $SR_2$ are connected to the secondary windings of the transformer T. The rectifying stage includes synchronous rectifiers $SR_1$, $SR_2$ and provides a rectified output at the output voltage Vout. In FIG. 1, the rectifying stage does not include or use diodes to provide a rectified output, but it is possible to use diodes instead of synchronous rectifiers $SR_1$, $SR_2$.

The controller can be a digital signal controller (DSC), which combines the features and functions of microcontrollers and digital signal processors (DSPs), and can be used to control the converter with quasi-PIR control. The controller can be configured and/or programmed to provide the functions and to implement the methods discussed below. That is, the controller can be configured and/or programmed to provide PI control and quasi-resonant control, as discussed below. The controller is connected to the output voltage Vout and controls the on-times of the switches $Q_1$, $Q_2$.

The controller receives an analog signal that corresponds to the output voltage Vout. As shown in FIG. 1, the analog signal can be provided by a difference amplifier DA whose two inputs are connected to the two output terminals. The controller includes analog-to-digital converter AD that converts the analog signal to the signal Vo that is a digital signal corresponding to output voltage Vout.

The signal Vo is used both in PI control and in quasi-resonant control. Two different sampling periods $T_{PI}$, $T_R$ are used to provide discrete PI control and to provide discrete resonant control. For example, as shown in FIG. 1, if the switching frequency is around 200 kHz, within the range of 180 kHz to 240 kHz, then a sampling frequency of the PI control can be set at 200 kHz, i.e., $T_{PI}=1/(200\ kHz)$. For quasi-resonant control with a reference voltage of 120 Hz, the sampling points are preferably more than 100, which means that the sampling frequency is preferably larger than 12 kHz. An integral multiple of $T_{PI}$ is easy to realize in digital control. Thus, multiplying $T_{PI}$ by twelve provides $T_R=12/(200\ kHz)=1/116.6\ kHz$. In each of the PI control and the resonant control, a continuous-time signal is generated from the sampled signal Vo using a digital-to-analog converter such as a zero-order hold (ZOH). The continuous-time signals in both PI control and resonant control are compared to a reference Vref, which produces error signals $e_{PI}(k)$, $e_R(k)$.

The error signal $e_{PI}(k)$ is provided to a discrete PI controller, and the error signal $e_R(k)$ is provided to a discrete resonant controller. The discrete PI controller and the discrete resonant controller provide outputs $U_{PI}(k)$, $U_R(k)$, which are then combined as output $U_{PIR}(k)$. The output $U_{PIR}(k)$ is provided to a voltage-to-frequency converter, which outputs the signal f. The signal f is provided to a pulse-frequency modulation (PFM) controller, which controls the on-times of the switches $Q_1$, $Q_2$ so that the output voltage Vout can be regulated.

Quasi-PIR control of the LLC converter shown in FIG. 1 is discussed below with reference to specific parameters listed in Table 1. The specific parameters are examples only. It should be understood that other values and ranges of the parameters are possible in various preferred embodiments of the present invention. It should also be understood, for example, that "about" in reference to parameters includes manufacturing and component tolerances.

TABLE 1

| parameters of LLC converter | |
| --- | --- |
| Magnetizing inductor Lp | 100 µH |
| Resonant inductor Lr | 12 µH |
| Resonant capacitor $C_r$ | 36 nF |
| Resonant frequency $f_r$ | 242 kHz |
| Full load power | 300 W |
| Transformer turns ratio n | 17:1 |

Figure 2:
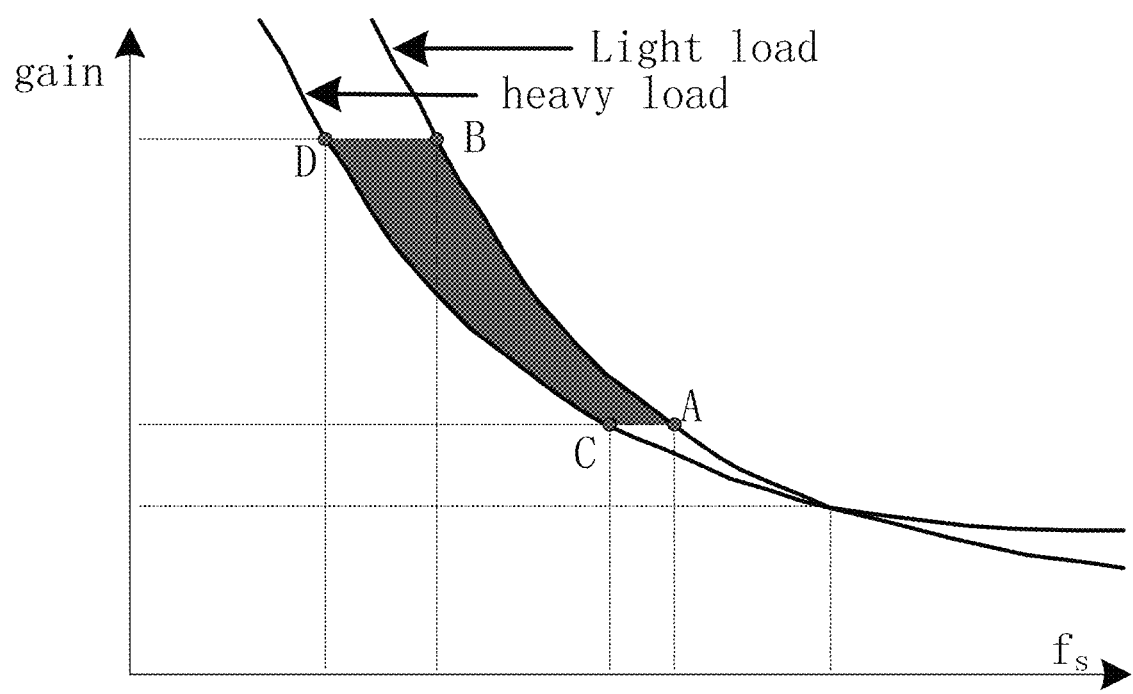
FIG. 2 shows the gain of the LLC converter shown in FIG. 1 over the operating switching-frequency range of the LLC converter.

FIG. 2 shows the gain curve and operating range of the LLC converter shown in FIG. 1. The controller should be able to regulate the output voltage Vout at different input voltages and different loads, including point A (400 V, 60 W), point B (360 V, 60 W), point C (400 V, 300 W), and point D (360 V, 300 W).

In digital implementation, the PI controller and quasi-resonant controller are preferably discrete. The backward Euler approximation is a simple discrete method. Although the backward Euler approximation is used below, it is possible to use other approximation methods. It is shown in equation (1), where Ts is the sampling period.

$$s = \frac{1-z^{-1}}{T_s} \quad (1)$$

PI Controller

The PI controller is used to achieve a zero steady-state error in the DC output voltage. But the gain of the PI controller is not enough at 120 Hz. Thus, the PI control does not adequately address the 120-Hz ripple, meaning that the 120-Hz ripple is eliminated or sufficiently reduced.

The transfer function of a continuous PI controller is given by equation (2), where $k_p$, $k_i$ are the continuous proportional gain and integral gain.

$$G_{PI}(s) = k_p + \frac{k_i}{s} \quad (2)$$

The continuous proportional gain $k_p$ and continuous integral gain $k_i$ can be calculated or can be determined by simulation. For example, Powersim Simulation PSIM can be used to determine the continuous proportional gain $k_p$ and continuous integral gain $k_i$.

According to equations (1) and (2), the transfer function of the discrete PI-controller is given by equation (3), where $k_I = k_i T_{PI}$ and $T_{PI}$ is the sampling interval of the discrete PI controller.

$$G_{PI}(z) = \frac{(k_p + k_i T_{PI}) - k_p z^{-1}}{(1 - z^{-1})} = \frac{(k_p + k_I) - k_p z^{-1}}{(1 - z^{-1})} \quad (3)$$

Thus, the output $U_{PI}(k)$ is shown in equation (4), where error signals $e_{PI}(k)$ and $e_{PI}(k-1)$ are the discrete errors in the signal Vo in the current sampling period and the previous sampling period respectively; outputs $U_{PI}(k)$ and $U_{PI}(k-1)$ are the discrete PI controller outputs in the current sampling period and the previous sampling period, respectively.

$$U_{PI}(k) = U_{PI}(k-1) + (k_p + k_I)e_{PI}(k) - k_p e_{PI}(k-1) \quad (4)$$

Based on simulations and experimental testing, the following constants $k_p$, $k_i$ in the PI controller provide good performance, in which a very small steady-state error (e.g., less than 1% of the DC output voltage) is achieved at points A, B, C and D.

$$\begin{cases} k_p = 50 \\ k_I = 200 \end{cases} \quad (5)$$

The values of the constants $k_p$, $k_i$ can be different values.

Quasi-Resonant Controller

Compared to known resonant converters, the quasi-resonant controllers of the preferred embodiments of the present invention can achieve gain around 120 Hz and can eliminate the ripple when the grid voltage has small fluctuations, such as at 57 Hz to 63 Hz. The quasi-resonant control can follow the reference frequency if the gain is high enough. For example, the quasi-resonant controller can achieve high gain at 2 ω=120 Hz (in the range of 114 Hz to 126 Hz).

Because the quasi-resonant controller is used to reduce the 120-Hz ripple in the output voltage, the sampling period $T_R$ of the quasi-resonant converter can be longer, which reduces the amount of resources and processing time required by the quasi-resonant controller. For example, a resonant control which achieves infinite gain at 120 Hz but achieves small or zero gain at 114 Hz, can be problematic if the grid frequency is reduced to 57 Hz. In contrast, quasi-resonant control achieves high gain in a range around 120 Hz (e.g., 114 Hz to 126 Hz) but does not achieve infinite gain at 120 Hz.

Although only a single quasi-resonant controller is discussed below, it is possible to use multiple quasi-resonant controllers. For example, one quasi-resonant controller can address 120-Hz ripple and another quasi-resonant controller can address 240-Hz ripple.

Two types of quasi-resonant controllers can be used. Both quasi-resonant controllers can achieve near infinite gain at the desired frequency and can achieve zero steady-state error for a given AC signal with extended bandwidth as compared to a resonant controller. The extended bandwidth improves the ability to resist fluctuations in the grid frequency.

First Quasi-Resonant Controller

The transfer function of a first continuous quasi-resonant controller is given by equation (6), where ω is the line angular frequency, $ω_c$ is the bandwidth angular frequency, $k_r$ is resonant gain in the continuous quasi-resonant controller.

$$G_{R1}(s) = \frac{2k_r ω_c s}{s^2 + 2ω_c s + ω^2} \quad (6)$$

According to equations (1) and (6), the transfer function of the first discrete quasi-resonant controller is given by equation (7), where $α = 2ω_c T_R$, $k_R = k_r T_R^2$, $θ = ωT_R$, $k_R$ is the discrete resonant gain, and $T_R$ is the sampling interval of the resonant controller.

$$G_{R1}(z) = \frac{2k_r T_R^2 ω_c (1-z^{-1})}{(1-z^{-1})^2 + 2ω_c T_R(1-z^{-1}) + (ωT_R)^2} = \frac{k_R(1-z^{-1})}{(1-z^{-1})^2 + α(1-z^{-1}) + θ^2} \quad (7)$$

Thus, the output $U_{R1}(k)$ is given by equation (8). Errors $e_{R1}(k)$ and $e_{R1}(k-1)$ are the discrete errors in the signal Vo in the current sampling period and the previous sampling period, respectively. Outputs $U_{R1}1(k)$, $U_{R1}(k-1)$, $U_{R1}(k-2)$ are output values of the first quasi-resonant controller in the current sampling period, the previous sampling period, and the sample period before the previous sampling period.

$$U_{R1}(k) = \frac{2+\alpha}{1+\alpha+\theta^2} U_{R1}(k-1) - \qquad (8)$$
$$\frac{1}{1+\alpha+\theta} U_{R1}(k-2) + \frac{k_R}{1+\alpha+\theta}[e_{R1}(k) - e_{R1}(k-1)]$$

Second Quasi-Resonant Controller

The transfer function of a second continuous quasi-resonant controller is given by equation (9), where ω is the line angular frequency, $\omega_c$ is the bandwidth angular frequency, $k_r$ is resonant gain in the continuous quasi-resonant controller. The difference between equations (6) and (9) is the molecules $2k_r\omega_c s$ and $k_r$.

$$G_{R2}(s) = \frac{k_r}{s^2 + 2\omega_c s + \omega^2} \qquad (9)$$

According to equations (1) and (9), the transfer function of the second discrete quasi-resonant controller is given by equation (10), where $\alpha = 2\omega_c T_R$, $k_R = k_r T_R^2$, $\theta = \omega T_R$, $k_R$ is the discrete resonant gain, and $T_R$ is the sampling interval of the resonant controller.

$$G_{R2}(z) = \frac{k_r T_R^2}{(1-z^{-1})^2 + 2\omega_c T_R(1-z^{-1}) + (\omega T_R)^2} = \qquad (10)$$
$$\frac{k_R}{(1-z^{-1})^2 + \alpha(1-z^{-1}) + \theta^2}$$

Thus, the output $U_{R2}(k)$ is given by equation (11). Errors $e_{R2}(k)$ and $e_{R2}(k-1)$ are the discrete errors in the signal Vo in the current sampling period and the previous sampling period, respectively. Outputs $U_{R2}1(k)$, $U_{R2}(k-1)$, $U_{R2}(k-2)$ are output values of the second quasi-resonant controller in the current sampling period, the previous sampling period, and the sample period before the previous sampling period. Constants k1, k2, and k3 are defined in (12).

$$U_{R2}(k) = \frac{2+\alpha}{1+\alpha+\theta^2} U_{R2}(k-1) - \frac{1}{1+\alpha+\theta} U_{R2}(k-2) + \qquad (11)$$
$$\frac{k_R}{1+\alpha+\theta} e_{R2}(k)$$
$$= k_1 U_{R2}(k-1) - k_2 U_{R2}(k-2) + k_3 e_{R2}(k)$$

$$\begin{cases} k_1 = \frac{2+\alpha}{1+\alpha+\theta^2} \\ k_2 = -\frac{1}{1+\alpha+\theta} \\ k_3 = \frac{k_R}{1+\alpha+\theta} \end{cases} \qquad (12)$$

From equations (8) and (11), the control variables of the first and second quasi-resonant controllers are different. Equation (8) of the first quasi-resonant controller includes the difference of e(k) and e(k−1) which is equivalent to a differential element. This differential element can amplify noise signals. Because equation (11) of the second quasi-resonant controller does not include the difference of e(k) and e(k−1), the second quasi-resonant controller does not amplify noise signals, which is preferable in some applications.

As explained above, the sampling frequency of the second quasi-resonant controller can be set at 16.67 kHz. Based on simulations and experimental testing, the constants k1, k2, and k3 in equation (13) can be used.

$$\begin{cases} k1 = 2 \\ k2 = -1 \\ k3 = 200 \end{cases} \qquad (13)$$

The values of the constants $k_1$, $k_2$, $k_3$ can be different values.

Figure 3:
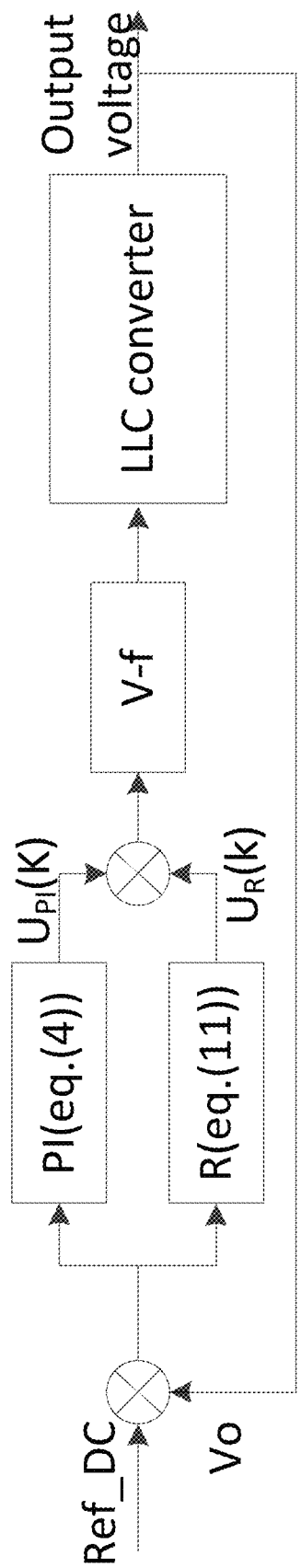
FIG. 3 is a block diagram of quasi-PIR control.

FIG. 3 is a block diagram of PI+quasi-resonant (quasi-PIR) control that uses the second quasi-resonant controller. Output $U_{PI}(k)$ is the control variable of the discrete PI controller, and output $U_R(k)$ is the control variable of the second discrete quasi-Resonant controller. FIG. 3 does not include a PFM function because it only shows an LLC function, but FIGS. 1 and 3 can achieve the same or comparable results.

Experimental Results

Below, experimental results are discussed in which a converter has open-loop control, PI control, and quasi-PIR control.

The open-loop-control experiments, i.e., experiments without PI control or resonant control, were conducted at points A, B, C, and D in FIGS. 4-7. A 120-Hz ripple with 10 V RMS is added to the input voltage. In open-loop control, the switching frequency is constant, i.e., $U_{PI}(k)+U_R(k)$=constant.

Figure 4:
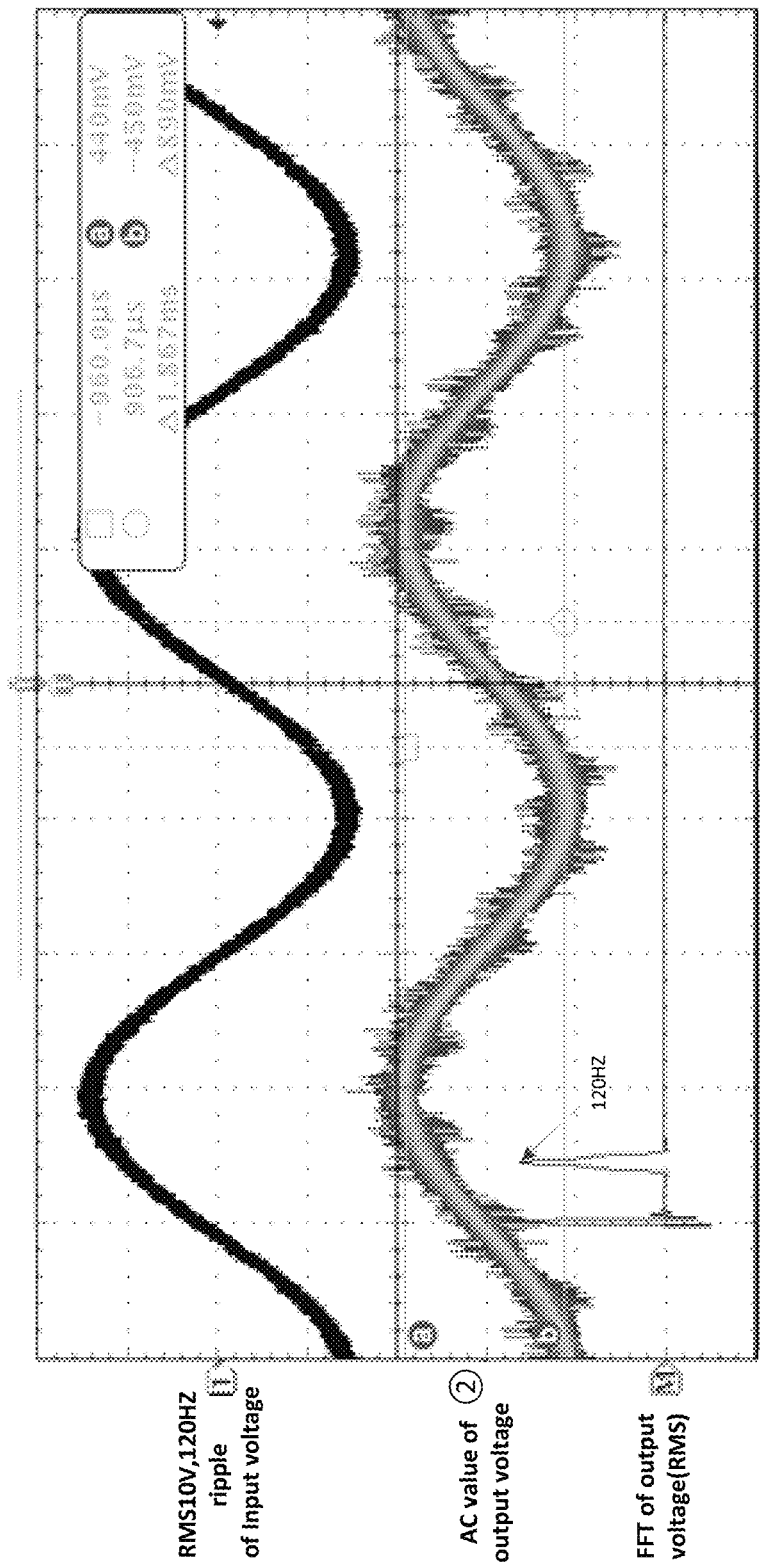
FIGS. 4-15 shows experimental results using open-loop control, PI control, and quasi-PIR control.

FIG. 4 with open-loop control shows the input voltage, the output voltage, and the fast Fourier transform (FFT) analysis of the output voltage at Point A (400 V, 60 W). The 120-Hz peak-peak value of the output voltage ripple is 890 mV.

Figure 5:
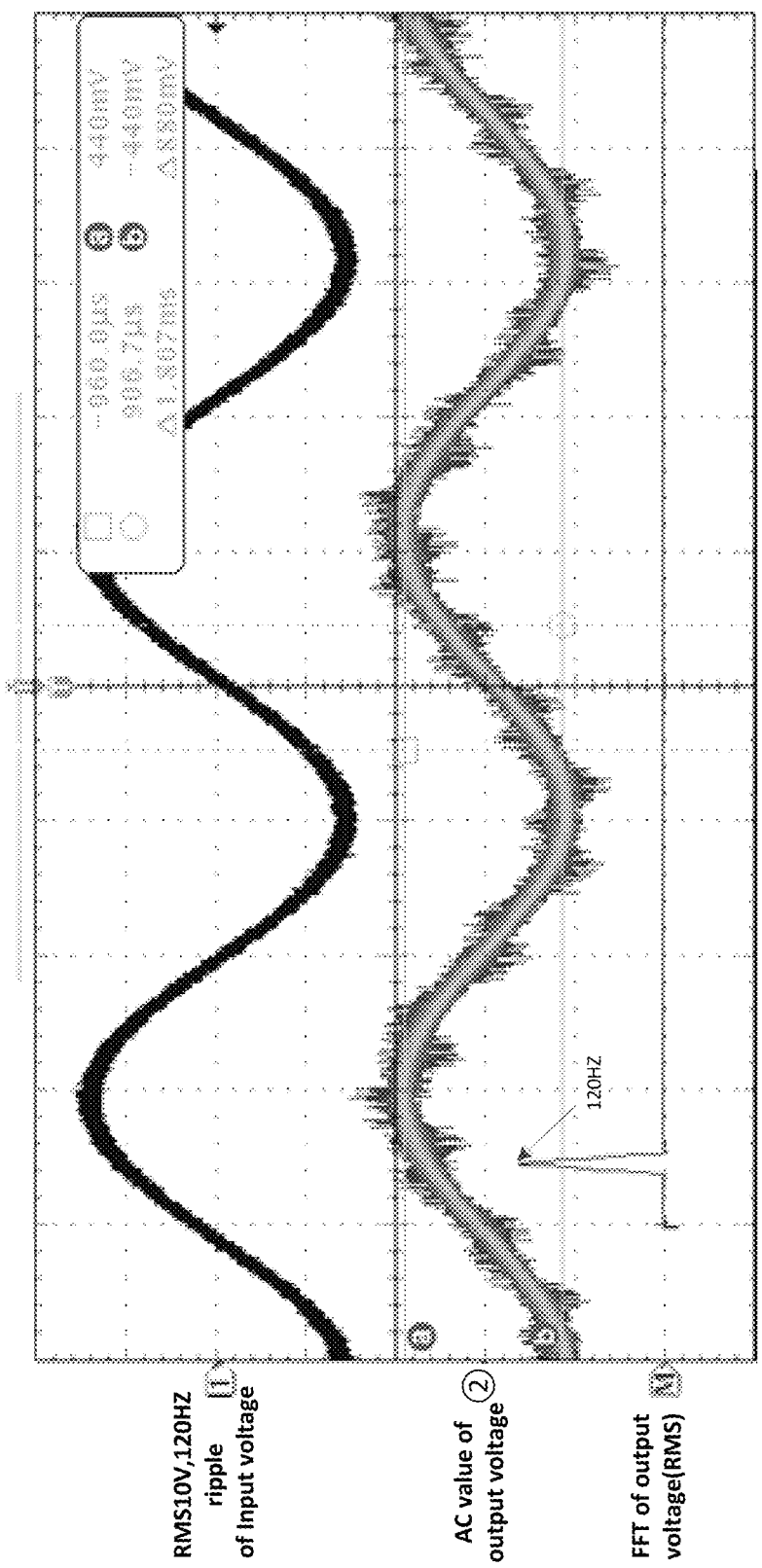

FIG. 5 with open-loop control shows the input voltage, the output voltage, and the FFT analysis of the output voltage at Point B (360 V, 60 W). The 120-Hz peak-peak value of the output voltage ripple is 880 mV.

Figure 6:
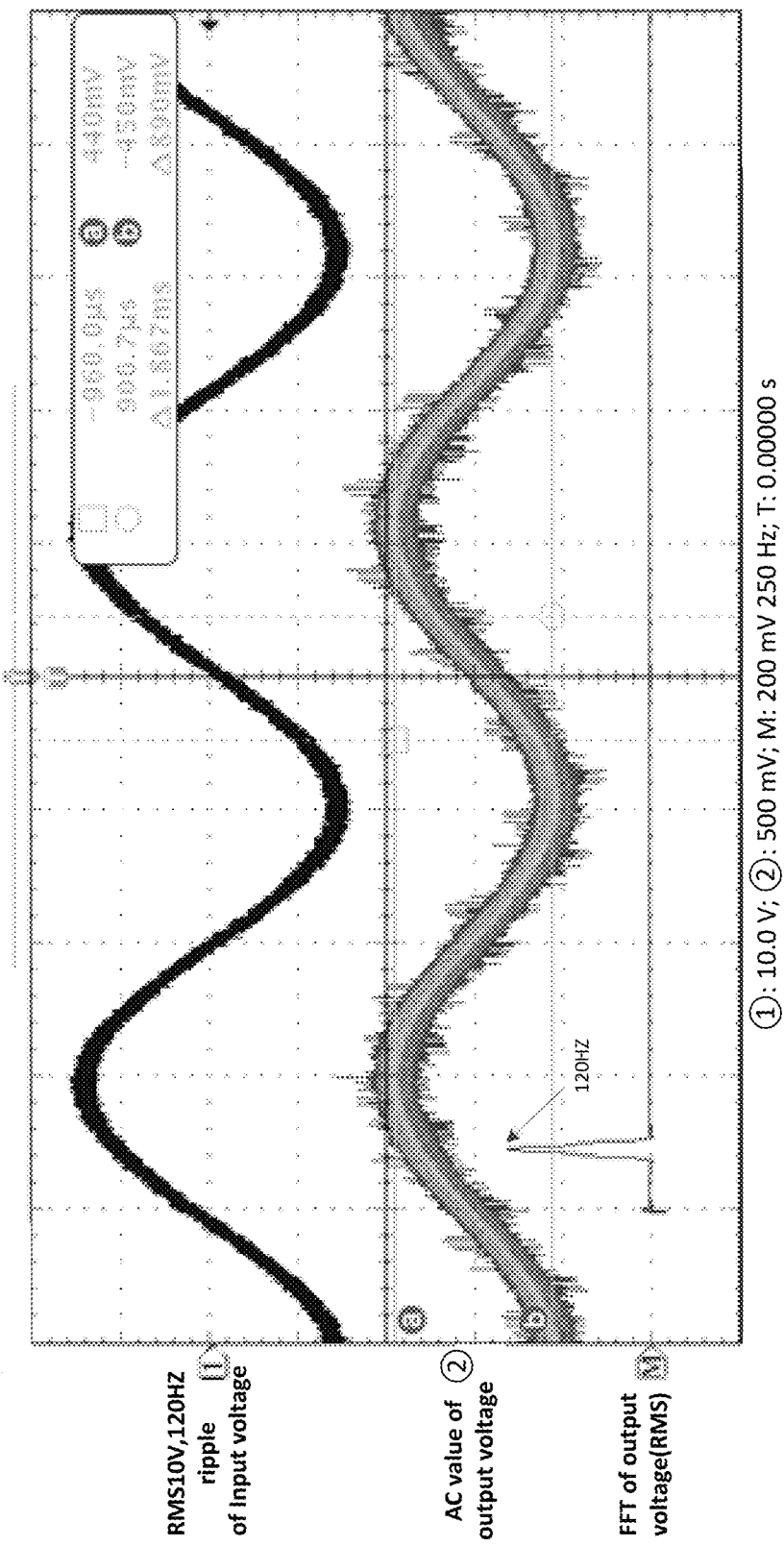

FIG. 6 with open-loop control shows the input voltage, the output voltage, and the FFT analysis of the output voltage at Point C (400 V, 300 W). The 120-Hz peak-peak value of the output voltage ripple is 890 mV.

Figure 7:
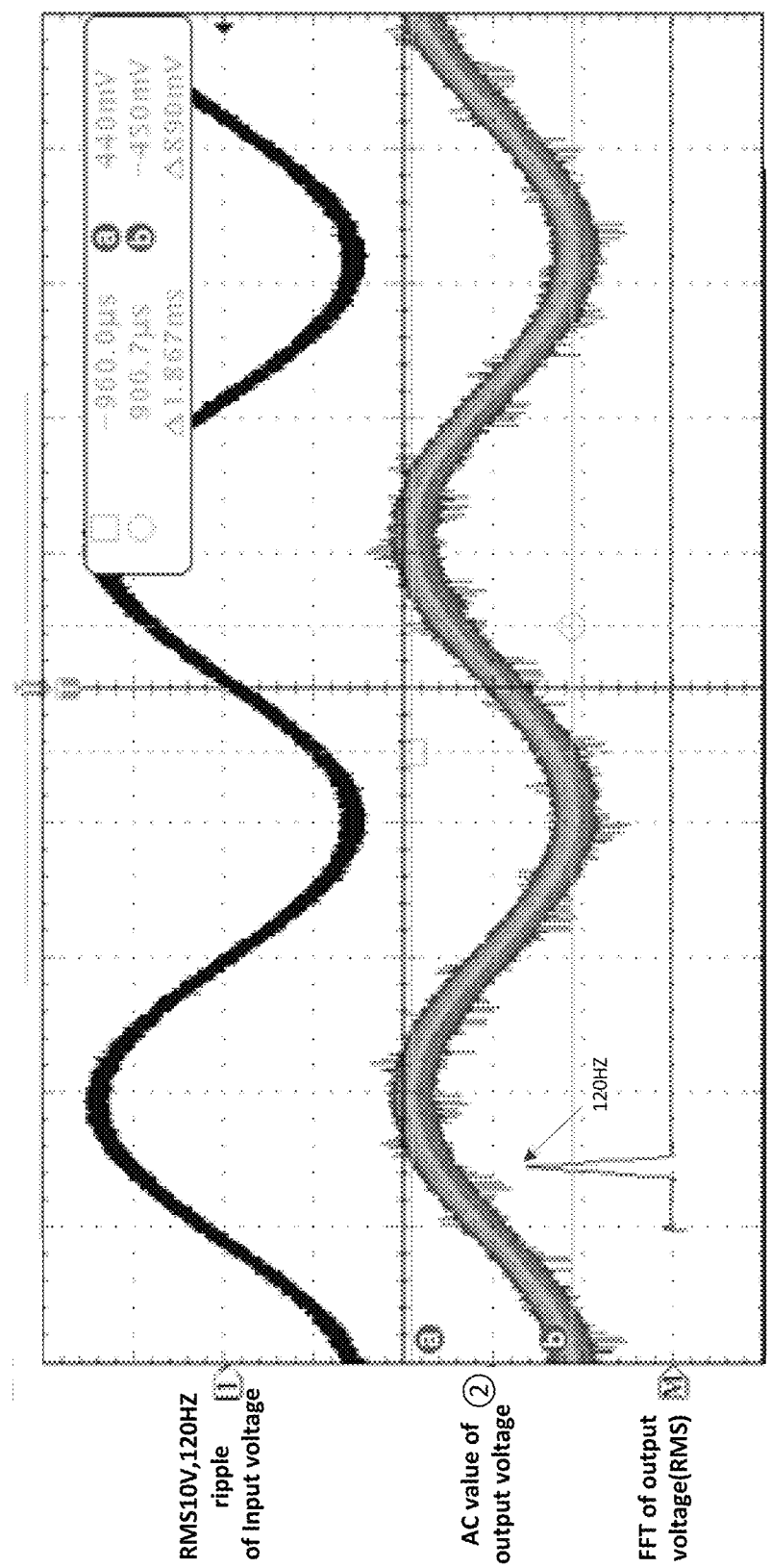

FIG. 7 with open-loop control shows the input voltage, the output voltage, and the FFT analysis of the output voltage at Point D (360 V, 300 W). The 120-Hz peak-peak value of the output voltage ripple is 890 mV.

The PI-control experiments were conducted at points A, B, C, and D in FIGS. 8-11. The output of the quasi-resonant controller was disabled ($U_R(k)$=0).

Figure 8:
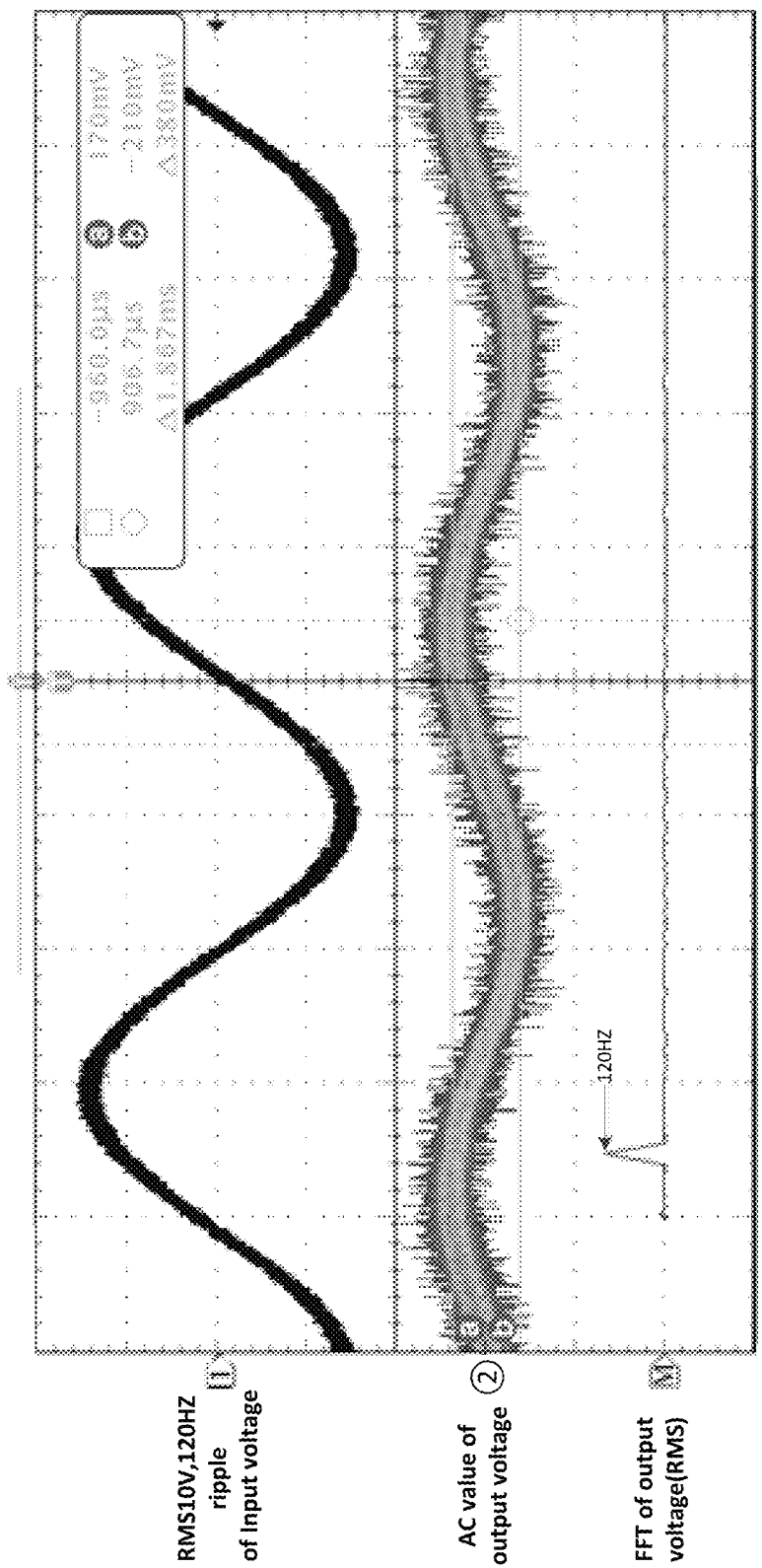

FIG. 8 with PI control shows the input voltage, the output voltage, and the FFT analysis of the output voltage at Point A (400 V, 60 W). The 120-Hz peak-peak value of the output voltage ripple is 380 mV.

Figure 9:
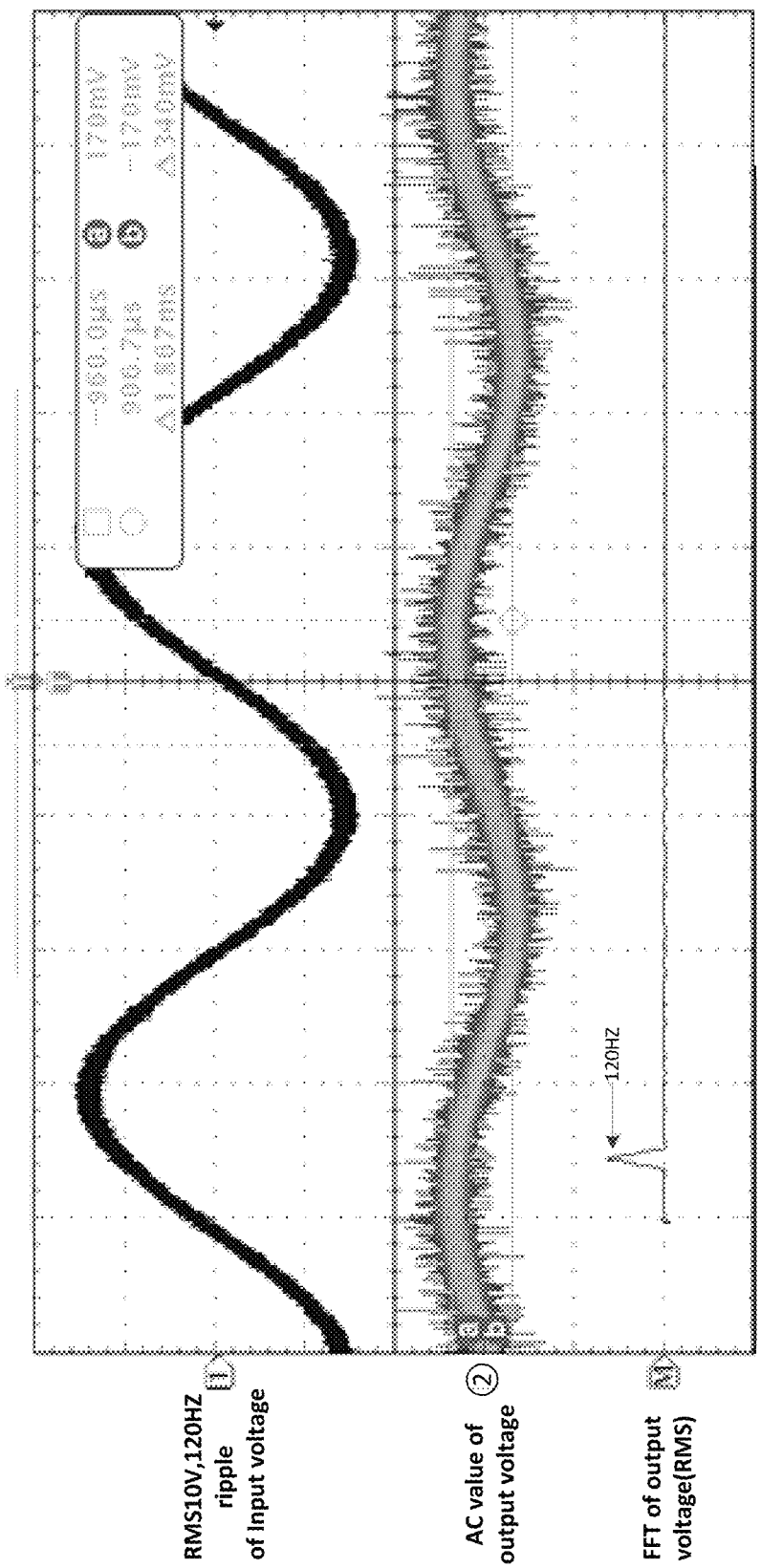

FIG. 9 with PI control shows the input voltage, the output voltage, and the FFT analysis of the output voltage at Point B (360 V, 60 W). The 120-Hz peak-peak value of the output voltage ripple is 340 mV.

Figure 10:
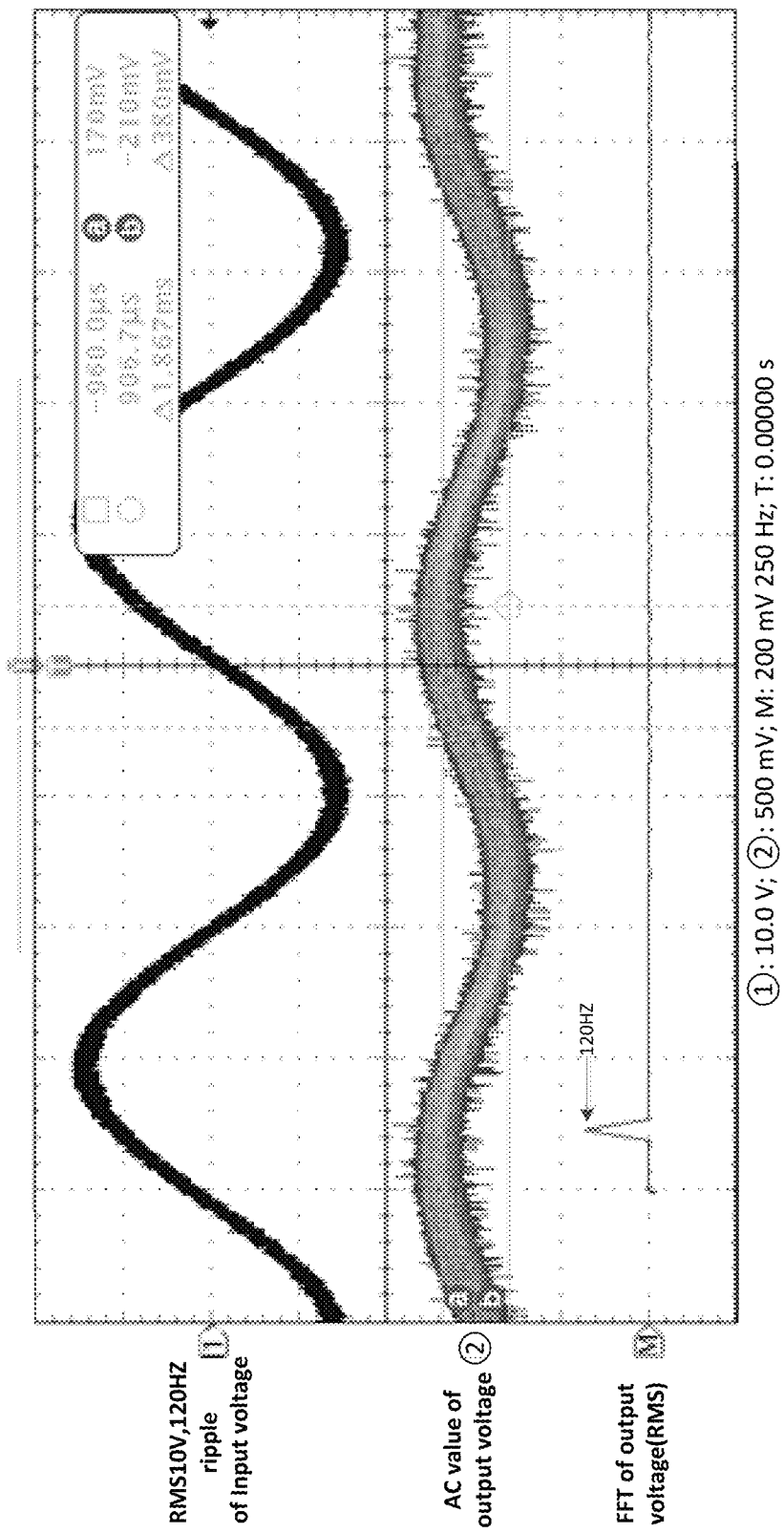

FIG. 10 with PI control shows the input voltage, the output voltage, and the FFT analysis of the output voltage at Point C (400 V, 300 W). The 120-Hz peak-peak value of the output voltage ripple is 380 mV.

Figure 11:
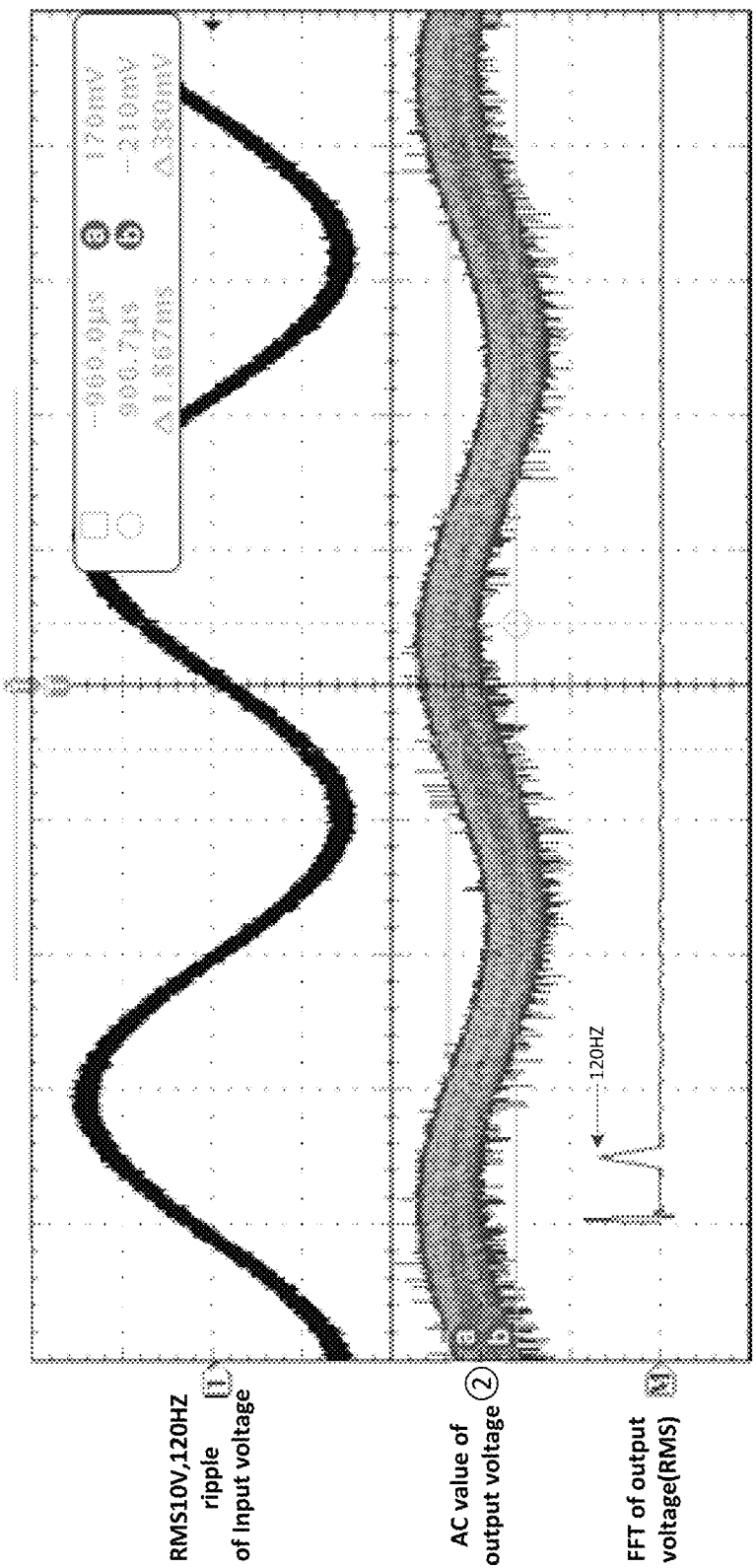

FIG. 11 with PI control shows the input voltage, the output voltage, and the FFT analysis of the output voltage at Point D (360 V, 300 W). The 120-Hz peak-peak value of the output voltage ripple is 380 mV.

The quasi-PIR-control experiments were conducted at points A, B, C, and D in FIGS. 12-15.

Figure 12:
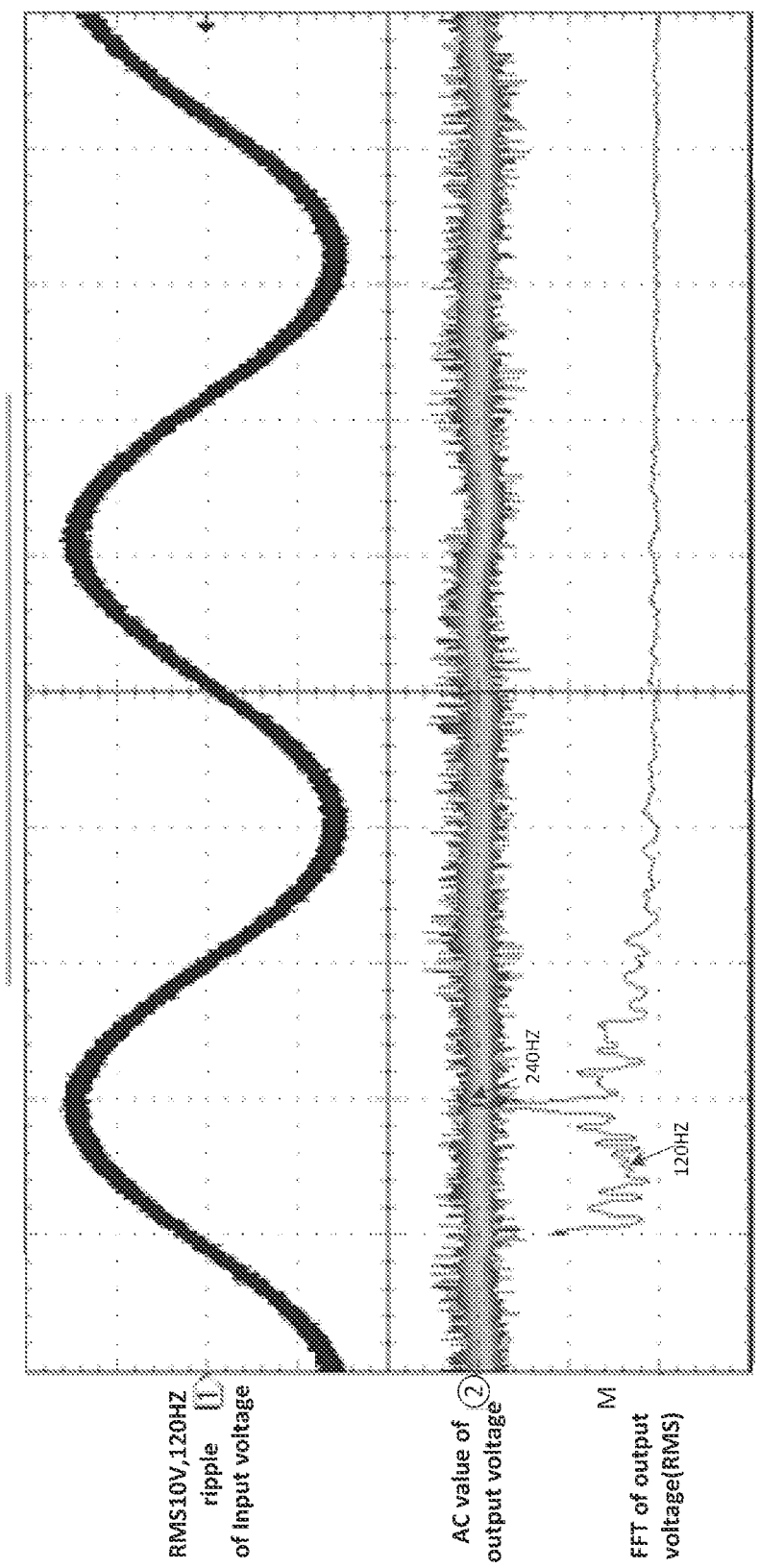

FIG. 12 with quasi-PIR control shows the input voltage, the output voltage, and the FFT analysis of the output voltage at Point A (400 V, 60 W). The 120-Hz peak-peak value of the output voltage ripple is 5.6 mV. The 240-Hz peak-peak value of the output voltage ripple is about 28 mV.

Figure 13:
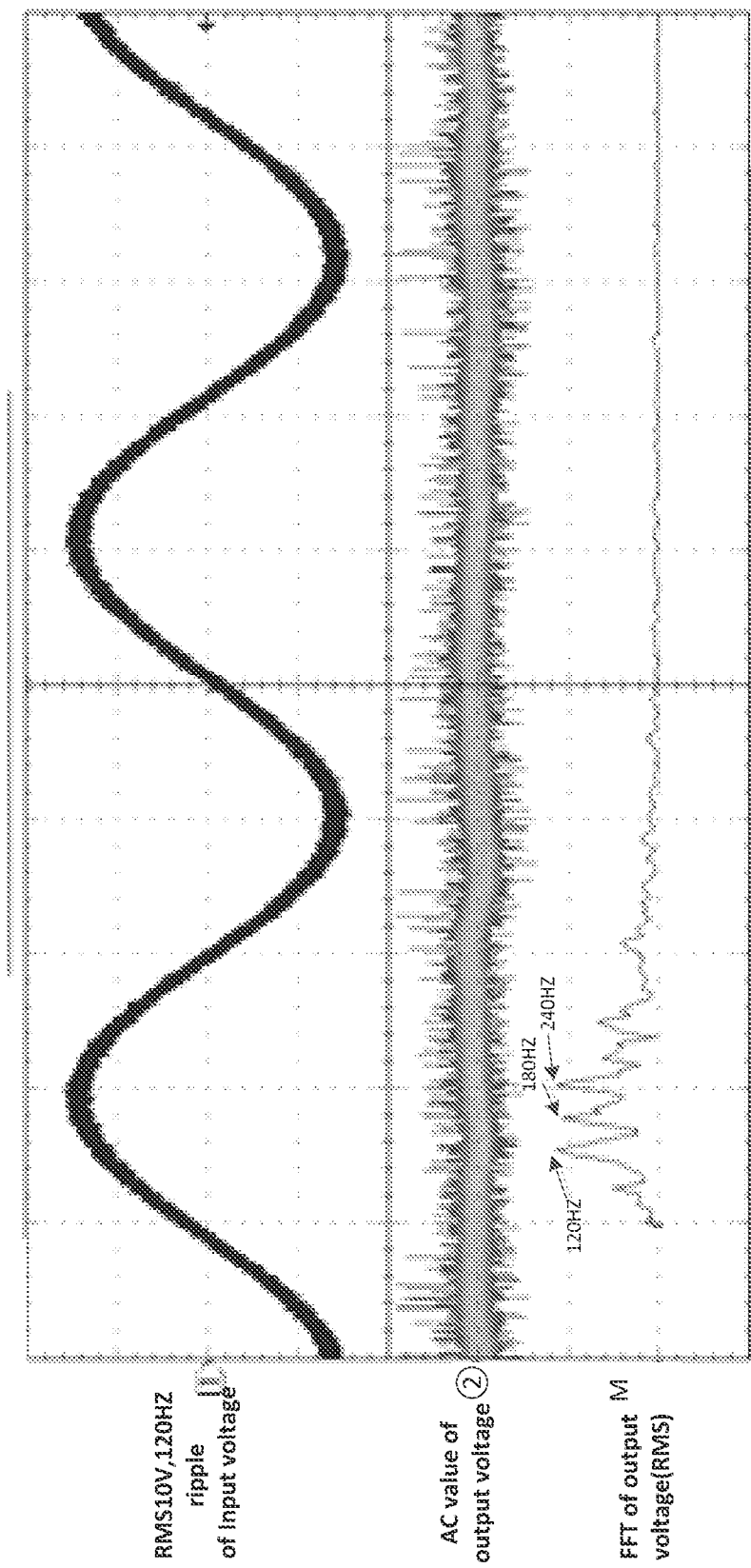

FIG. 13 with quasi-PIR control shows the input voltage, the output voltage, and the FFT analysis of the output voltage at Point B (360 V, 60 W). The 120-Hz peak-peak value of the output voltage ripple is 15.5 mV. The 180-Hz peak-peak value of the output voltage ripple is about 14 mV. The 240-Hz peak-peak value of the output voltage ripple is about 16 mV.

Figure 14:
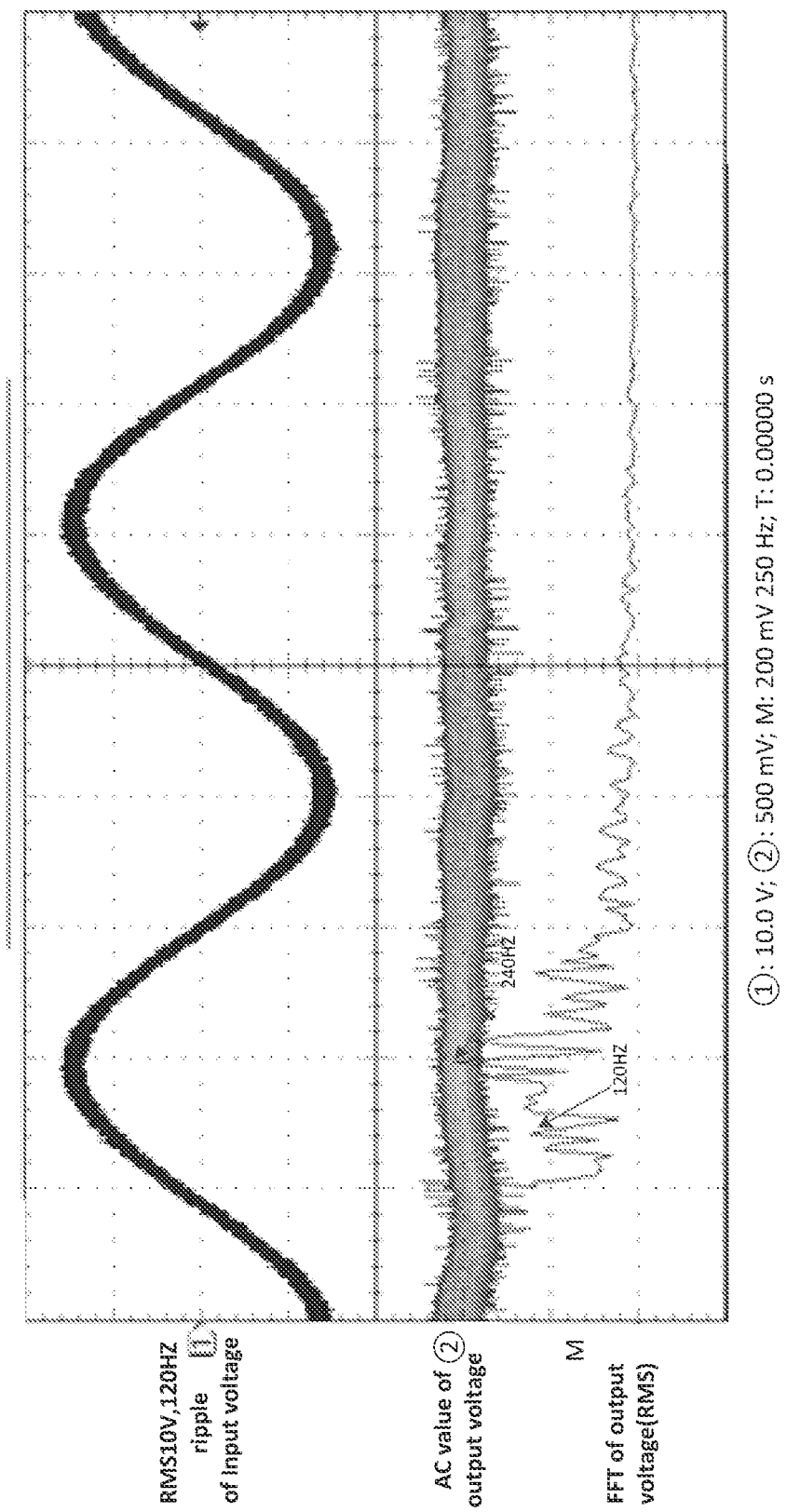

FIG. 14 with quasi-PIR control shows the input voltage, the output voltage, and the FFT analysis of the output voltage at Point C (400 V, 300 W). The 120-Hz peak-peak value of the output voltage ripple is 17 mV. The 240-HZ peak-peak value of the output voltage ripple is about 30 mV.

Figure 15:
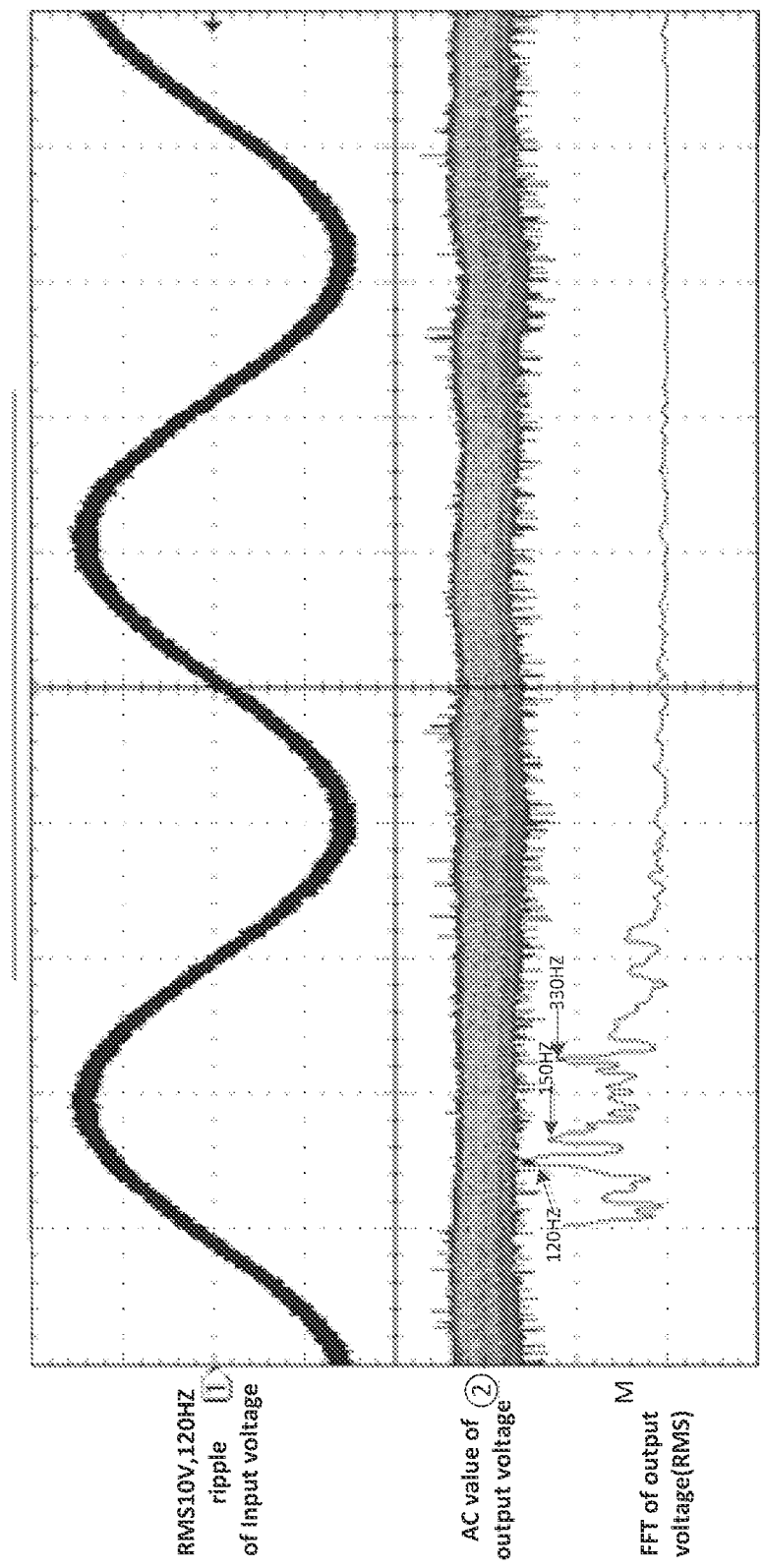

FIG. 15 with quasi-PIR control shows the input voltage, the output voltage, and the FFT analysis of the output voltage at Point D (360 V, 300 W). The 120-Hz peak-peak value of the output voltage ripple is 22.5 mV. There is some minor ripple at sidebands, e.g. 150 Hz and 330 Hz.

Figure 16:
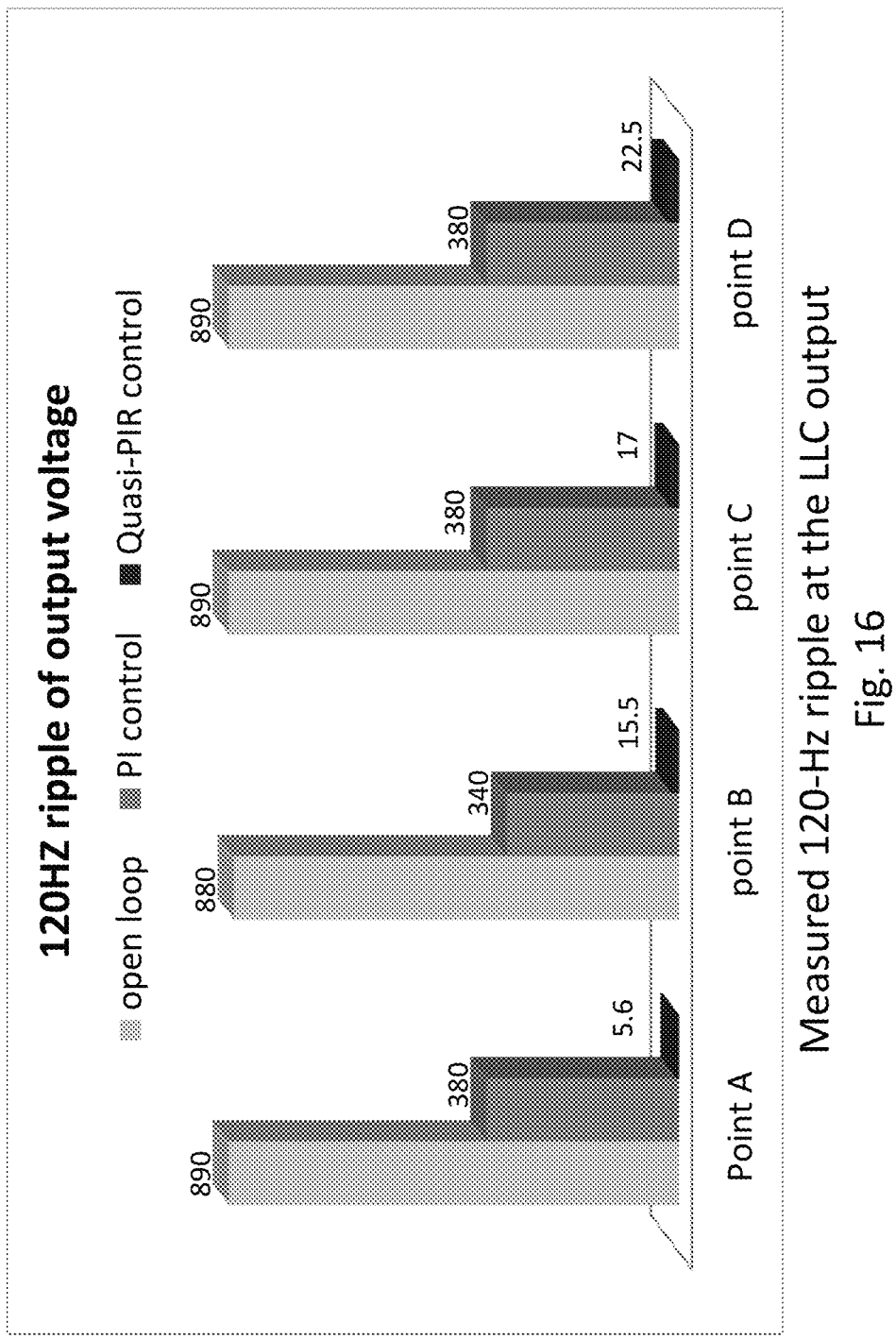
FIG. 16 shows the 120-Hz ripple in the output voltage of the experiments conducted in FIGS. 4-15.

FIG. 16 shows the 120-Hz ripple in the output voltage in open-loop control, PI control, and quasi-PIR control. FIG. 16 shows that quasi-PIR control achieves excellent reduction in the 120-Hz ripple with a simple design.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An LLC converter comprising:
   a transformer that includes a primary winding and a secondary winding;
   a resonant stage that includes the primary winding;
   a switching stage that includes switches and that is connected to an input voltage and the resonant stage;
   a rectifying stage that is connected to the secondary winding and that provides an output voltage; and
   a controller that senses the output voltage and that controls switching of the switches based on proportional-integral control of the output voltage to reduce errors in the output voltage with respect to a DC voltage and based on quasi-resonant control of the output voltage to reduce errors in the output voltage with respect to a range of voltages with a frequency bandwidth.

2. The LLC converter of claim 1, wherein a first sampling period of the proportional-integral control is shorter than a second sampling period of the quasi-resonant control.

3. The LLC converter of claim 1, wherein the controller controls the switching of the switches using pulse-frequency modulation.

4. The LLC converter of claim 1, wherein the proportional-integral control and the quasi-resonant control are both discrete control.

5. The LLC converter of claim 4, wherein a transfer function of the quasi-resonant control is provided by:

$$G_{R2}(z) = \frac{k_r T_R^2}{(1-z^{-1})^2 + 2\omega_c T_R(1-z^{-1}) + (\omega T_R)^2} = \frac{k_R}{(1-z^{-1})^2 + \alpha(1-z^{-1}) + \theta^2}$$

where $\omega$ is a line angular frequency, $\omega_c$ is a bandwidth angular frequency, $k_r$ is resonant gain in continuous quasi-resonant control, $\alpha = 2\omega_c T_R$, $k_R = k_r T_R^2$, $\theta = \omega T_R$, $k_R$ is a discrete resonant gain, and $T_R$ is the second sampling period of the quasi-resonant control.

6. The LLC converter of claim 1, wherein the range of voltages includes a voltage with a frequency of 120 Hz.

7. The LLC converter of claim 1, wherein the resonant stage further includes a resonant inductor, a resonant capacitor, and a magnetizing inductor.

8. The LLC converter of claim 1, wherein the switching stage includes first and second primary switches that are controlled by the controller.

9. The LLC converter of claim 1, wherein the rectifying stage includes first and second synchronous rectifiers.

10. The LLC converter of claim 1, wherein the controller is a digital signal controller.

11. A method of controlling an LLC converter comprising:
    sensing an output voltage of the LLC converter; and
    switching switches connected to a primary winding of a transformer included in the LLC converter based on proportional-integral control of the output voltage to reduce errors in the output voltage with respect to a DC voltage and based on quasi-resonant control of the output voltage to reduce errors in the output voltage with respect to a range of voltages with a frequency bandwidth.

12. The method of claim 11, further comprising:
    sampling the output voltage with a first sampling period with respect to the proportional-integral control; and
    sampling the output voltage with a second sampling period with respect to the quasi-resonant control; wherein
    the second sampling period is longer than the first sampling period.

13. The method of claim 11, wherein the switching uses pulse-frequency modulation.

14. The method of claim 11, wherein the proportional-integral control and the quasi-resonant control are both discrete control.

15. The method of claim 14, wherein a transfer function of the quasi-resonant control is provided by:

$$G_{R2}(z) = \frac{k_r T_R^2}{(1-z^{-1})^2 + 2\omega_c T_R(1-z^{-1}) + (\omega T_R)^2} = \frac{k_R}{(1-z^{-1})^2 + \alpha(1-z^{-1}) + \theta^2}$$

where $\omega$ is a line angular frequency, $\omega_c$ is a bandwidth angular frequency, $k_r$ is resonant gain in a continuous quasi-resonant controller, $\alpha = 2\omega_c T_R$, $k_R = k_r T_R^2$, $\theta = \omega T_R$, $k_R$ is a discrete resonant gain, and $T_R$ is a sampling period of the quasi-resonant control.

16. The method of claim 11, wherein the range of voltages includes a voltage with a frequency of 120 Hz.

17. The method of claim 11, wherein the switches are connected to a resonant stage that includes a resonant inductor, a resonant capacitor, a magnetizing inductor, and the primary winding.

18. The method of claim 11, wherein the switching includes switching first and second primary switches connected to the primary winding.

19. The method of claim 11, further comprising rectifying a voltage from a secondary winding of the transformer to provide the output voltage.

20. The method of claim 11, wherein the switching is controlled using a digital signal controller.

* * * * *